(12) United States Patent
Yates

(10) Patent No.: US 6,257,662 B1
(45) Date of Patent: Jul. 10, 2001

(54) LOUNGE BICYCLE SADDLE

(76) Inventor: Paul M. Yates, 5814 Briar Tree, La Canada, CA (US) 91011

( * ) Notice: Subject to any disclaimer, the term of this patent is extended or adjusted under 35 U.S.C. 154(b) by 0 days.

(21) Appl. No.: 09/558,274

(22) Filed: Apr. 25, 2000

(51) Int. Cl.[7] .................................................. B62J 1/18
(52) U.S. Cl. ...................... 297/214; 297/202; 297/215.16
(58) Field of Search ................................ 297/195.1, 202, 297/214, 215, 215.16, DIG. 2

(56) References Cited

U.S. PATENT DOCUMENTS

| | | |
|---|---|---|
| 718,850 * | 1/1903 | Kruseman . |
| 797,072 * | 8/1905 | Perkin . |
| 5,020,852 * | 6/1991 | Marion . |
| 5,108,076 | 4/1992 | Chiarella ............................... 297/195 |
| 5,356,205 | 10/1994 | Calvert et al. ......................... 297/452 |
| 6,027,166 | 2/2000 | Yates ..................................... 297/195 |
| 6,030,035 | 2/2000 | Yates ..................................... 297/214 |
| 6,106,059 * | 8/2000 | Minkow et al. . |

* cited by examiner

*Primary Examiner*—Milton Nelson, Jr.
(74) *Attorney, Agent, or Firm*—Walter A. Hackler

(57) ABSTRACT

A springless bicycle saddle is provided which includes a molded unitary shell and pad. Rails attached to the shell enable the saddle to be mounted on a bicycle seat and a resilient component disposed between the shell and the pad provides for cushioning. In addition, the three components may be assembled through the use of screws which also provide adjustment of the resiliency of the resilient component disposed between the pad and shell. The shell may include two pods with an arched member interconnecting the pods providing enhanced resiliency without contact with the rails. Upturned edges of the pod enables nesting of the pad and resilient component in the pods which eliminates stapling or sewing steps, thus reducing production costs.

19 Claims, 5 Drawing Sheets

LOUNGE BICYCLE SADDLE

The present invention relates to an improved anatomical bicycle saddle and particularly relates to a saddle having a resilient component disposed between molded unitary top and bottom shells.

The comfort in bicycle riding is extremely important, particularly during long distance riding. Accordingly, many bicycle saddles have been designed to improve comfort for a rider over long periods of time.

Early seat construction materials have utilized rigid metal or plastic shells which are covered by a leather or plastic sheet material.

A number of cushions have also been designed for use between a leather or plastic sheet material and in underlying rigid metal or plastic frame or shells. These pods or cushions have been provided in an attempt to avoid or relieve pressure to the ischial bone ends of the rider's body. Further improvement to the saddle have included openings or cavities beneath such bone ends in order to prevent pressure thereto.

However, such earlier designed seats have not provided sufficient comfort for the rider, particularly when the seat is used in long distance bicycle riding. In such long distance riding, a "lounge" type seat is preferable in order to provide the ultimate end comfort for the rider.

A number of saddle cushion covers or pods have also been developed and sold in the market place which are attached on top of a conventional seat. Unfortunately, prior art designs involved multiple components which are both difficult to manufacture, not only due to the manual assembly required, for example, sewing or stitching, but the assembly of the components themselves.

The present invention provides for a comfortable "lounge" type saddle which is amenable for mass production because it includes a few components, and the structural design of the components also facilitates assembly of the saddle with minimal labor requirements.

Importantly, the saddle can eliminate any need for springs. This not only eliminates components hereinbefore used in a majority of prior art saddles, but also, because of spring elimination, even support for the rider is enabled without the necessity of accommodating for high pressure points which may be introduced through the use of springs.

SUMMARY OF THE INVENTION

A bicycle saddle in accordance with the present invention includes front and rear pods with a pair of rails extending therebetween. An arched member interconnects the pods and is disposed over the rails. A cushion is disposed in the front and rear pods and over the arched member. The arched member is resilient in order to provide enhanced cushioning in a midsection of the saddle without contacting the rails. Each of the pods may include upturned edges for covering a perimeter of the cushion.

The cushion may comprise a resilient pad with a resilient component therein, and may be integrally molded. The saddle includes no separate springs and accordingly is of simple manufacture.

In another embodiment of the present invention includes a molded shell having a relatively narrow fore portion and a relatively wide aft portion. Rail means are provided and attached to the shell for enabling the saddle to be mounted on a bicycle post. A molded pad is provided and a resilient component, or material, is disposed between the shell and pad. In one embodiment of the present invention, the pad and resilient component may be molded together. In another embodiment of the present invention, the shell, pad and resilient component may be molded together. This provides for an economically manufactured bicycle saddle.

In yet another embodiment of the present invention, means are provided for partially compressing the resilient component between the shell and pad in order to provide uniform cushioning effect therebetween.

More particularly, in a further embodiment, the resilient pad has an exterior wall and a hollow interior, with the exterior wall having a perimeter generally matching the pad perimeter. Preferably, the resilient component exterior wall includes accordion folds which controls and/or enhances the compressibility of the resilient component.

More preferably, the accordion folds are present in the rear portion of the exterior wall. The means for partially compressing the resilient component comprises a plurality of screws extending between the shell and the pad. More specifically, the resilient component includes a top and a bottom, which interconnect with the exterior wall and each of the shell, pad and resilient component are contoured with a longitudinal groove down the entry of the shell, pad and resilient component. The longitudinal groove may establish an opening or a hole through the saddle. This structural feature enables relief for a bicycle rider by avoiding pressure contacts with sensitive areas.

The shell includes fore and aft undercarriages and the rail means is disposed between the fore and aft undercarriages.

It is to be appreciated that the means for partially compressing the resilient component between the bottom and the top shells also provides a means for adjusting the resiliency of the resilient component between the shell and the pad. When the resilient component is compressed less, the total overall movement enabled by the gel is much greater than when the resilient component is under higher compression. Thus, the softness of the ride can be adjusted at any time by the rider by turning the plurality of screws extending the shell, pad and through the resilient component.

BRIEF DESCRIPTION OF THE DRAWINGS

The present invention may be more clearly understood with reference to the following detailed description in conjunction with the appended drawings, in which.

DETAILED DESCRIPTION

With reference to FIGS. 1–9, there is shown a bicycle saddle 10, which generally includes a shell 12 and a molded pad 14, with a resilient component 16 disposed between the shell 12 and pad, 14.

Figure 5:
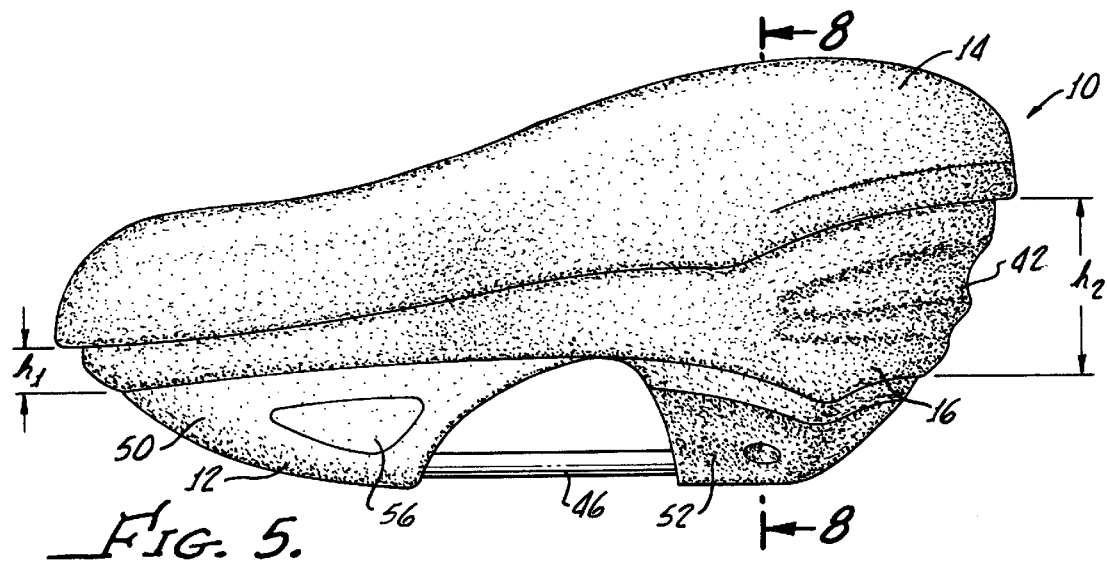
FIG. 5 is a side elevational view of the bicycle saddle shown in FIG. 1.
Figure 6:
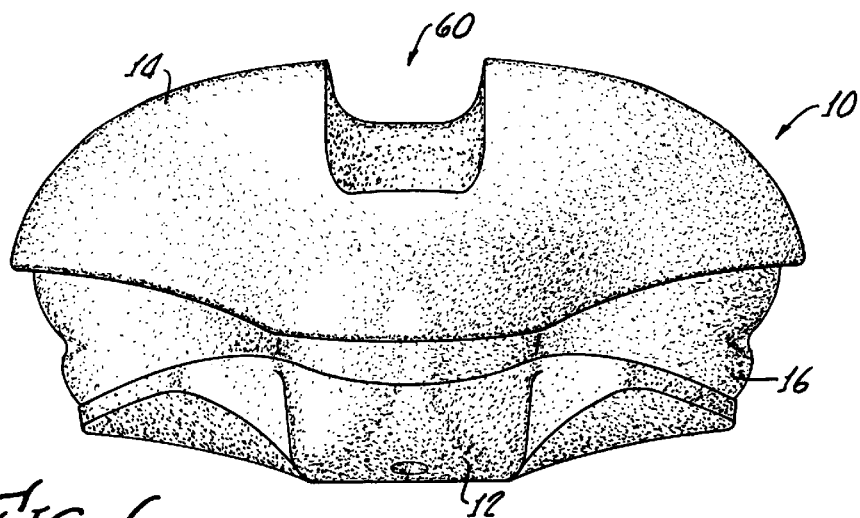
FIG. 6 is a front elevational view of the bicycle saddle shown in FIG. 1.
Figure 7:
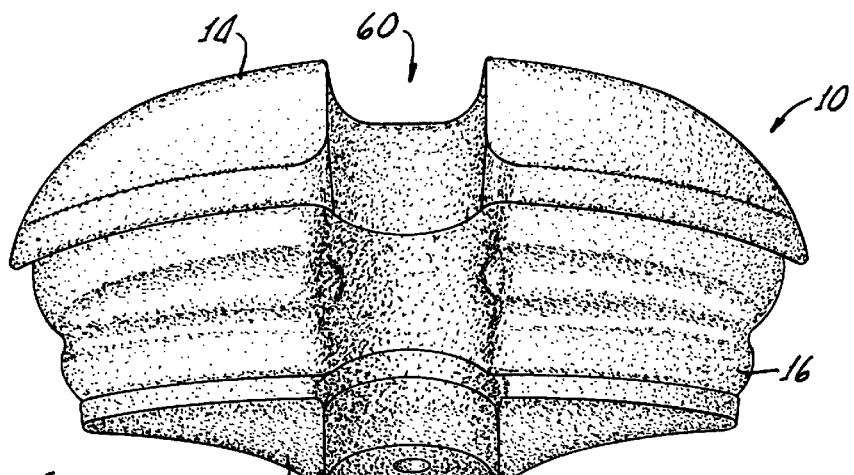
FIG. 7 is a rear elevational view of the bicycle saddle shown in FIG. 1.

The shell 12, and pad 14 may be molded in any conventional manner, such as, for example, compression molded or injection molding, and may be formed from any suitable plastic material suitable for such forming. In view of the fact that the shell 12 and pad 14 are injection molded, it is clear that little manual labor is required. As shown in FIGS. 5–7, the shell 12 and pad 14 and resilient component may be molded together, using molding techniques disclosure, are U.S. Pat. Nos. 5,679,193; 5,756,184; 5,774,966; 5,904,396; 5,932,046; 5,993,584; and 6,007,149 which are incorporated herewith in their entirety.

The shape of the shell 12 and pad 14 is as shown in FIGS. 1–7, with the molded unitary pad 14 having a perimeter 20 generally matching a perimeter 22 of the shell 12. This conformality of perimeters provides for directly overlying the pad 14 on the shell 12, which provides comfort to the rider by eliminating any separately protruding portions.

Figure 8:
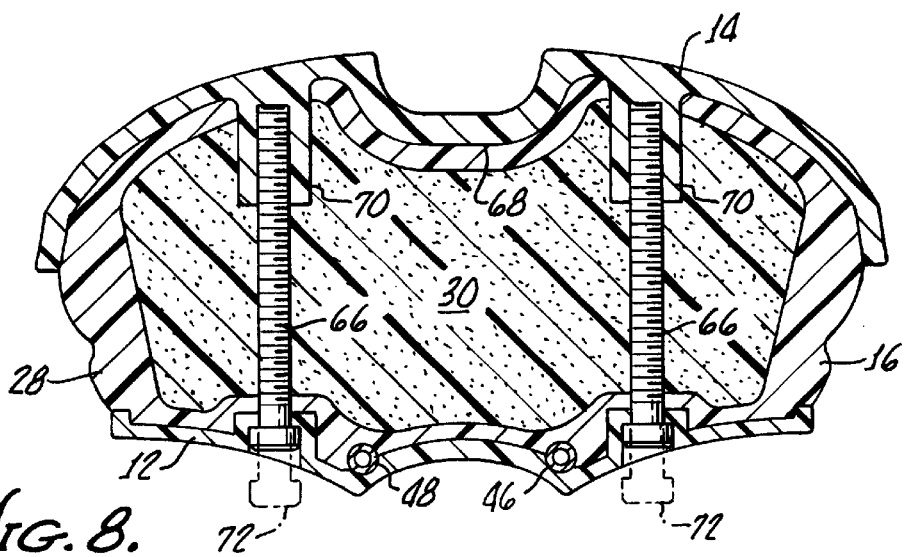
FIG. 8 is a cross sectional view of the saddle shown in FIG. 5 taken along the line 8—8.

The resilient component 16 disposed between the shell 12 and pad, 14 may be of any suitable gel or foam which can preferably be molded. As shown in the embodiment of FIG. 8, the resilient gel or foam 16 has an exterior wall 28 and a hollow interior 30.

The resiliency of the gel, and the wall 28, can be enhanced through the use of molding accordion folds 42 into the gel 16. Selective positioning of the accordion folds 42 also may be utilized to adjust the overall resiliency of the gel or foam 16. That is, while primarily shown in the aft portion 38 of the lower shell 12, the accordion folds 42 may extend totally around the perimeter of the gel or foam 16 between the shell 12 and pad 14.

Rails 46, 48 attached to the shell 12, preferably between fore and aft undercarriages 50, 52 (see FIG. 5) provide a means for enabling the saddle 10 to be mounted on a bicycle post (not shown) in a conventional manner.

An opening 56 disposed in the fore undercarriage 50 may be provided for providing greater wall strength in the fore undercarriage 50 and to lighten the saddle 10.

Figure 3:
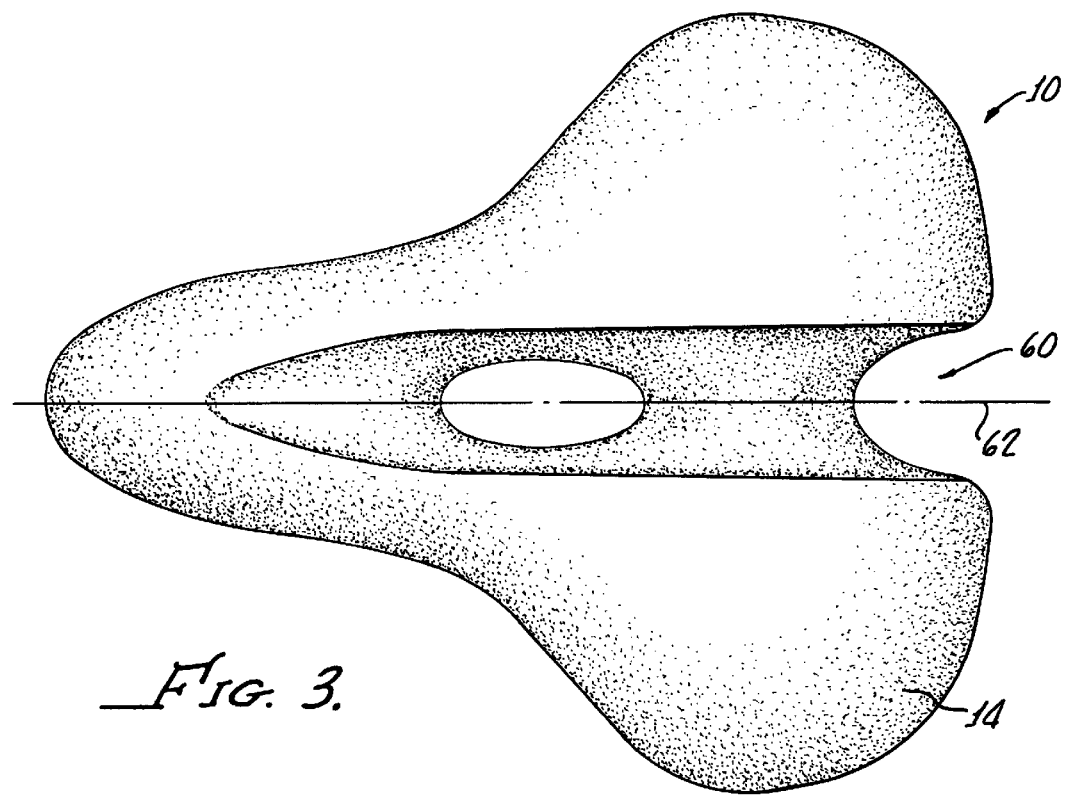
FIG. 3 is a top view of the saddle shown in FIG. 1, more clearly showing a shell, pad, and resilient cushion, in a contoured configuration with a longitudinal groove down the center thereof with a hole through the saddle.
Figure 4:
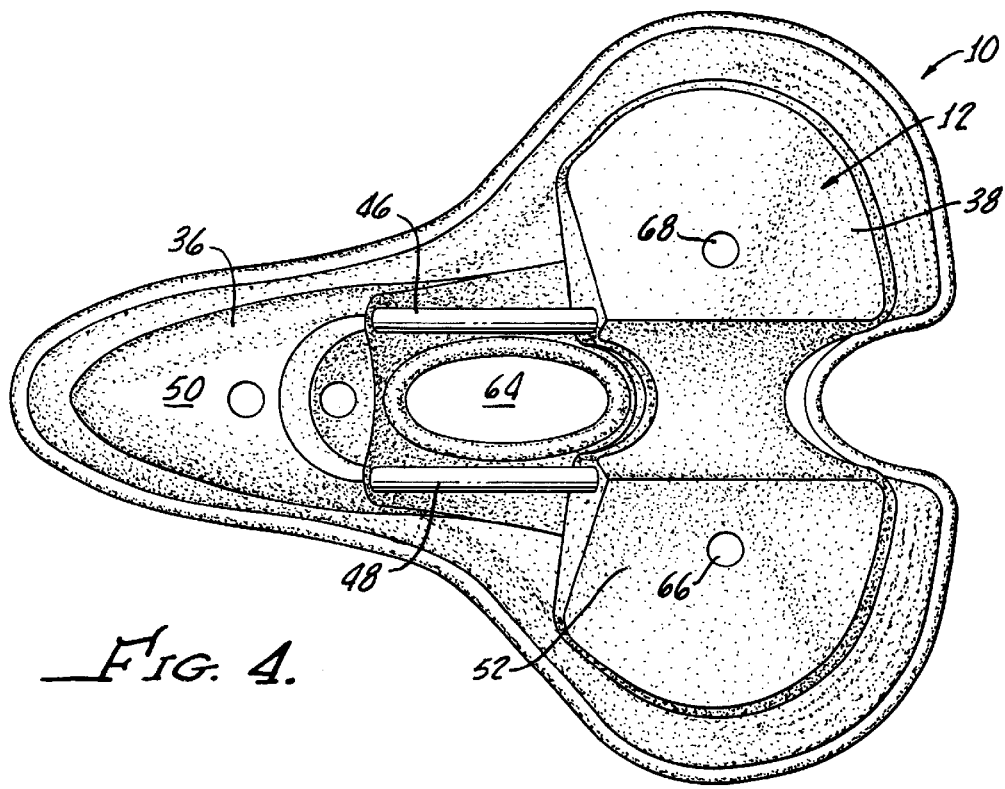
FIG. 4 is a bottom plan view of the bicycle saddle shown in FIG. 1, more clearly showing the position of rails extending between shell undercarriages and screws for not only assembling the bicycle saddle, but providing a means for compressing the resilient component which in turn provides a means for adjusting resiliency of the gel between the pad and shell.

In order to enhance the comfort of the saddle and eliminate pressure points to a rider, the pad 12 and shell 14 and resilient gel or foam 16 may be contoured with a longitudinal groove 60 down a longitudinal axis 62. As best shown in FIGS. 3 and 4, the groove may include an opening 64 therethrough in order to provide additional comfort and ventilation to the rider. All of these configurations are included in the molds for the shell 12, pad 14 and gel or foam 16. Accordingly, no manual steps such as sewing, trimming and the like, are required in the manufacture of the saddle 10 in accordance with the present invention.

Importantly, as shown in the cross section of FIG. 8, the three major components of the saddle 10, namely, the shell 12, pad 14 and gel or foam, may be held together by screws, or bolts, 66, extending between the shell 12, pad 14 and through the gel or foam 16. The screws are secured to an underside 68 through the use of tapable posts 70 molded into the underside 68 of the pad 14.

The screws 66 not only maintain assembly of the saddle 10, but importantly, provide a means for adjusting the initial resiliency of the gel or foam 16 between the shell 12 and pad 14. By turning the screws 66 farther into the posts 70, the gel 16 is compressed between the shell 12 and pad 14, the compression of the gel or foam changing the initial resiliency thereof between the shell 12 and pad 14.

The screws 66 do not engage the shell 12 enabling further compression of the gel 30 by a rider, not shown. Such further compression causes the screws 66 and heads 72 to protrude from the shell 12 as shown in dashed line in FIG. 8.

Additionally, in view of the spaced apart relationship between the screws 66, the resiliency of the gel 16 or foam may be adjusted differently over the fore portion 50 of the shell 12 and the aft portion 52 of the shell 12. Thus, customized resiliency adjustment is provided with the structure of the present invention.

Figure 9:
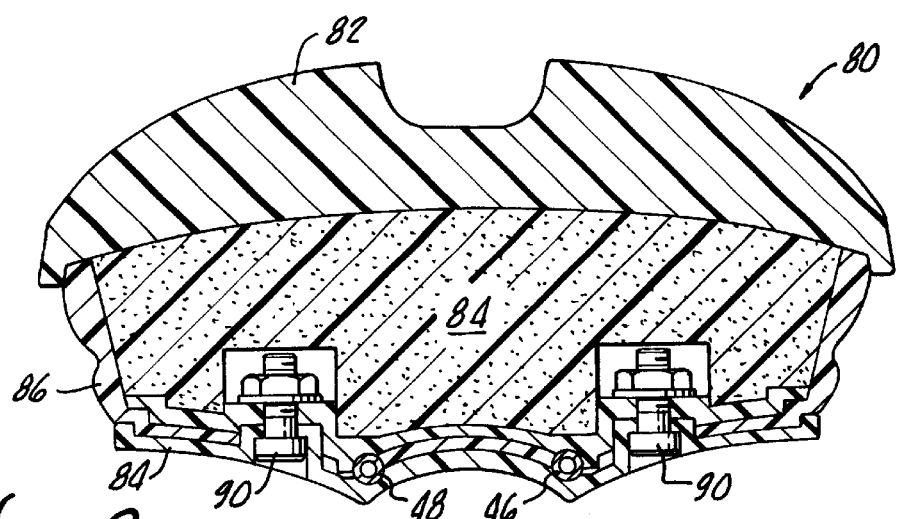
FIGS. 9 and 10 are alternate embodiments for securing the shell to the pad and resilient material.

FIG. 9 is an alternative embodiment 80 of the present invention utilizing a pad 82, and shell 84 and a gel 86 disposed therebetween with a foam-like plastic 88 thereinside. The pad 82 is adhered or molded to the plastic 88 and shell 82 and the latter is fixed to the shell 84 by way of screws 90.

Figure 10:
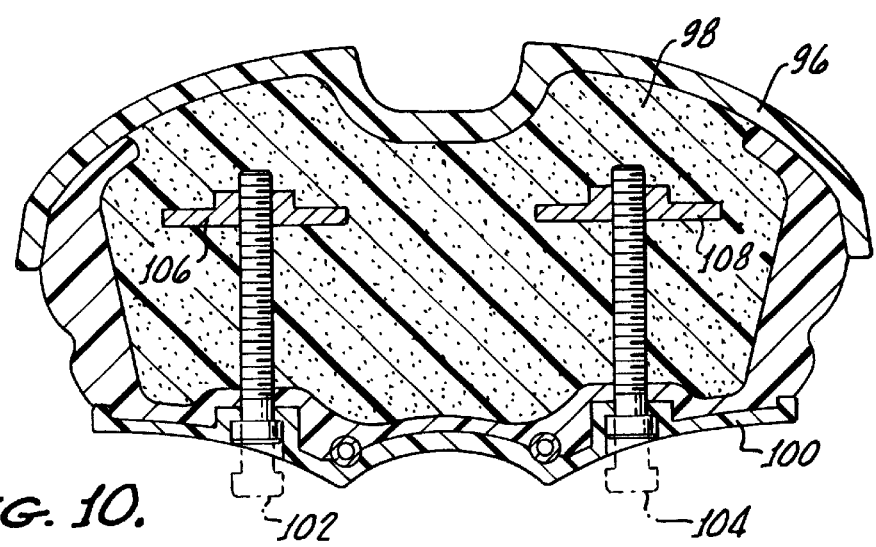

FIG. 10 shows another variation in which a shell 96 and gel 98 are attached to a shell 100 by way of bolts 102, 104 engaging threaded washers 106, 108 imbedded in the gel 98. As in the embodiment shown in FIG. 8, the bolts 102, 104 do not engage the shell 98 thereby enabling further compression of the gel 98.

Figure 11:
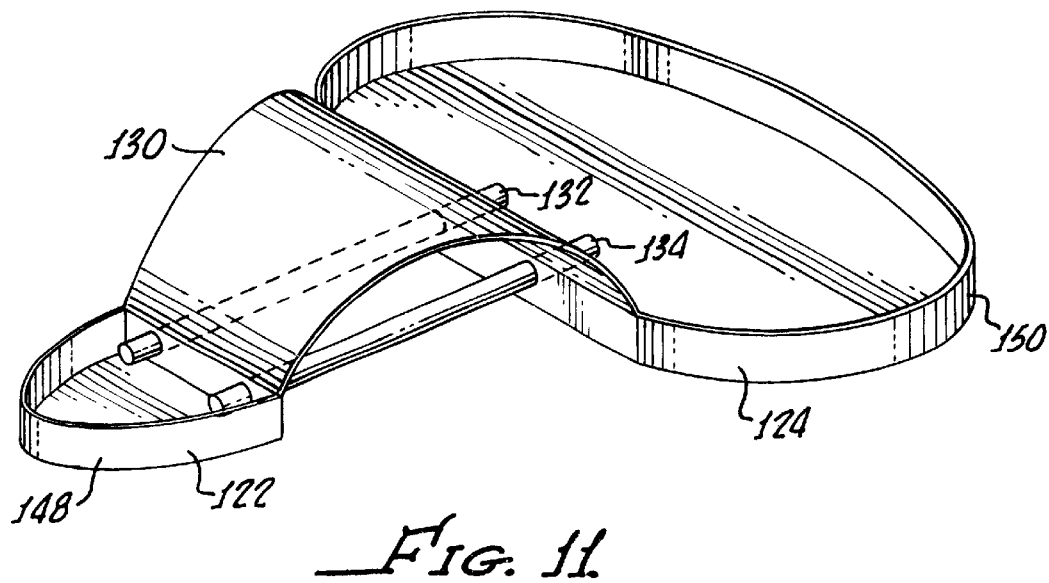
FIG. 11 is a perspective view of an alternative pad arrangement showing an arched member interconnecting front and rear pods with a pair of rails therebetween.
Figure 12:
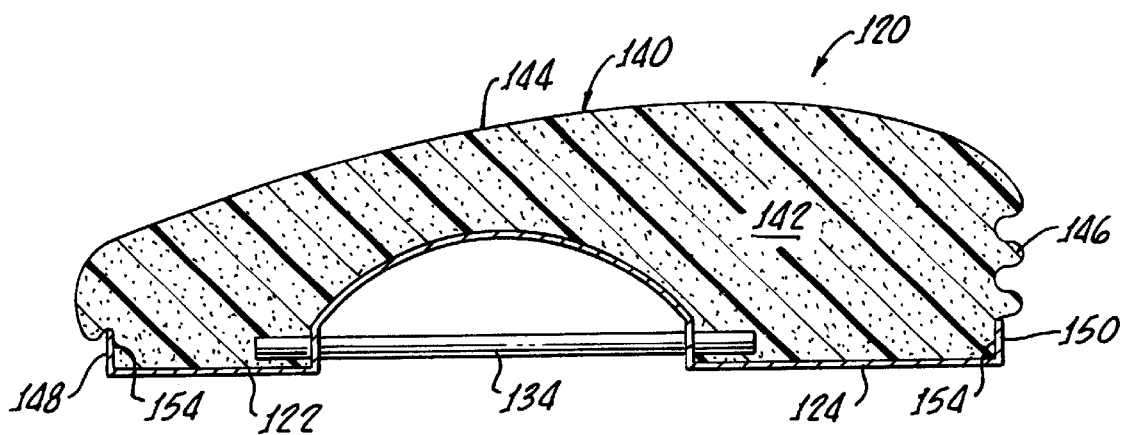
FIG. 12 is a cross-sectional view of a saddle in accordance with the present invention utilizing the pods of FIG. 12 along with a cushion disposed thereon and behind upturned edges of the rail.

Yet another bicycle saddle embodiment 120 is shown in FIGS. 11 and 12. In this instance, there is included a front pod 122 and a rear pod 124 interconnected by an arched member 130 and a pair of rails 132, 134, the rails being secured in the pods 122, 124 in any suitable manner. The arch member 130 may be molded integrally with the pods 122, 124 and provides enhanced resiliency of the saddle 120 without contacting the rails.

Figure 1:
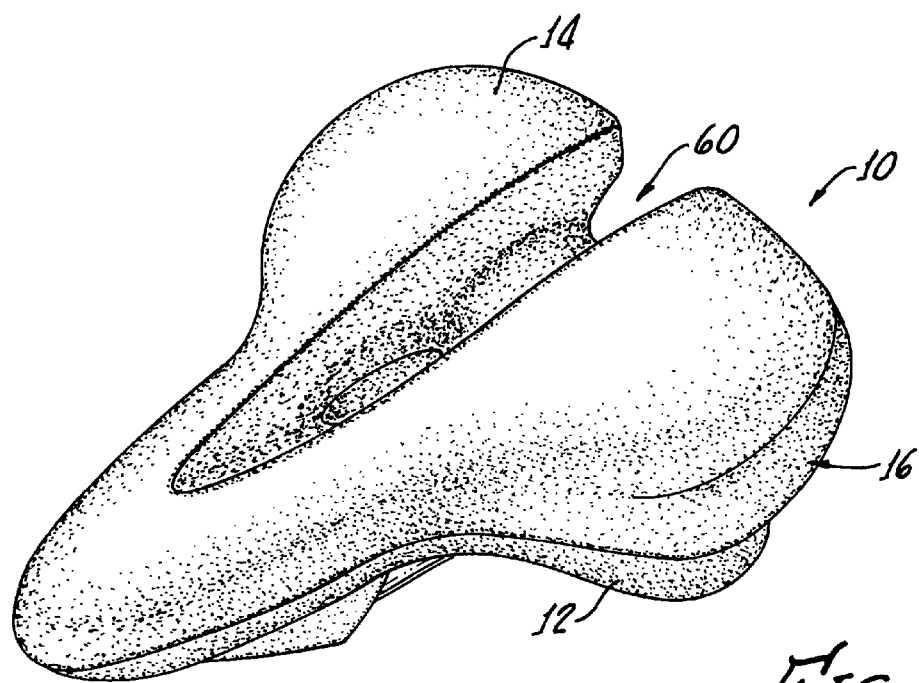
FIG. 1 is a top perspective view of one embodiment of a bicycle saddle in accordance with the present invention.
Figure 2:
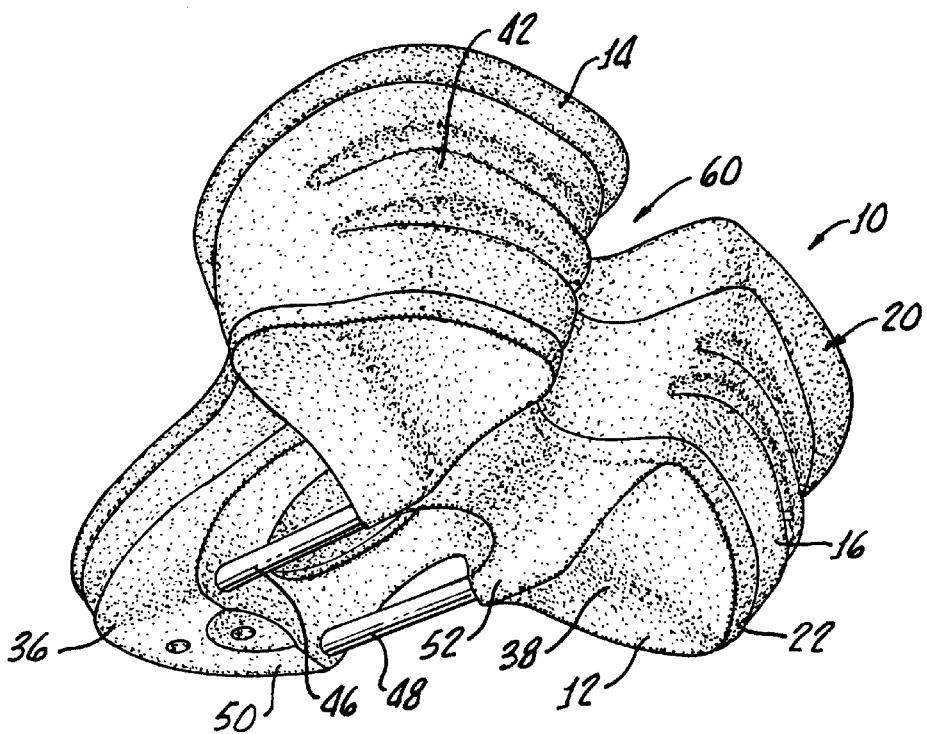
FIG. 2 is a bottom perspective view of the saddle shown in FIG. 1.

A cushion 140 is nested in the pods 122, 124 and conforms to the arched member 130. The cushion 140 may be adhered to the rails 122, 124 or integrally molded therewith as hereinbefore described. The cushion includes a gel 142, as hereinbefore described and a cover, or pad 144, also hereinbefore described. Accordion folds 146 also may be included such as shown in FIGS. 2 and 5.

Importantly, upturned edges, or rims, 148, 150 receive the cushion 140 in a nested manner covering a perimeter 154 of the cushion. Accordingly, no attachment means, such as staples or sewing, is necessary for connecting the shell, or covering, 148 with the gel 142 along the perimeter 154.

Although there has been hereinabove described a springless bicycle saddle in accordance with the present invention for the purpose of illustrating the manner in which the invention may be used to advantage, it will be appreciated that the invention is not limited thereto. Accordingly, any and all modifications, variations or equivalent arrangements which may occur to those skilled in the art, should be considered to be within the scope of the invention as defined in the appended claims.

What is claimed is:

1. A bicycle saddle comprising:
   front and rear pods;

a pair of straight rails interconnecting said front and rear pods;

an arched member interconnecting the front and rear pods and disposed over said pair of straight rails;

a cushion disposed in said front and rear pods and on said arched member, the arched member enabling enhanced resiliency of the saddle without contacting said pair of rails.

2. The bicycle saddle according to claim 1 wherein each of the pods includes upturned edges for covering a perimeter of said cushion.

3. The bicycle saddle according to claim 2 wherein said cushion comprising a resilient shell with a resilient component thereunder.

4. The bicycle saddle according to claim 3 wherein said resilient shell and resilient component are molded together.

5. The bicycle saddle according to claim 3 wherein the shell, resilient component and pods are molded together.

6. A bicycle saddle comprising:

a molded shell having a relatively narrow fore portion and a relatively wide aft portion;

rail means, attached to the shell, for enabling the saddle to be mounted on a bicycle post;

molded pad having a perimeter generally matching a perimeter of the shell;

a resilient component disposed between the shell and the pad, said resilient component having an exterior wall and a hollow interior, said exterior wall having a perimeter generally matching the pad perimeter; and means for partially compressing the resilient component between the shell and the pad.

7. The saddle according to claim 6 wherein the resilient component exterior wall includes accordion folds.

8. The saddle according to claim 7 wherein the resilient component exterior wall includes accordion folds in a rear portion of the exterior wall.

9. The saddle according to claim 6 wherein the means for partially compressing the resilient component comprises a plurality of screws extending between the shell and the pad and through the resilient component.

10. The saddle according to claim 9 wherein said resilient component includes a top and a bottom, interconnecting the exterior wall.

11. The saddle according to claim 10 wherein each of the shell, pad and resilient component are contoured with a longitudinal groove down a center of each of the shell, pad and resilient component.

12. The saddle according to claim 11 wherein the shell includes fore and aft undercarriages and said rail means is disposed between the fore and aft undercarriages.

13. A bicycle saddle comprising:

a molded shell having a relatively narrow fore portion and a relatively wide aft portion;

rail means, attached to the shell, for enabling the saddle to be mounted on a bicycle post;

a molded pad having a perimeter generally matching a perimeter of the shell;

a resilient component disposed between the shell and pad, said resilient component has an exterior wall including accordion folds; and means for adjusting the resilience of the resilient component between the shell and pad.

14. The saddle according to claim 13 wherein the resilient component has an a hollow interior, said exterior wall having a perimeter generally matching the pad perimeter.

15. The saddle according to claim 14 wherein the resilient component exterior wall includes accordion folds in a rear portion of the exterior wall.

16. The saddle according to claim 14 wherein the means for adjusting the resiliency of the resilient component comprises a plurality of screws extending between the shell and the pad and through the resilient component.

17. The saddle according to claim 16 wherein said resilient component includes a top and a bottom, interconnecting the exterior wall.

18. The saddle according to claim 17 wherein each of the shell, pad and resilient component are contoured with a longitudinal groove down a center of each of the shell, pad and resilient component.

19. The saddle according to claim 18 wherein the shell includes fore and aft undercarriages and said rail means is disposed between the fore and aft undercarriages.

* * * * *